No. 725,989. PATENTED APR. 21, 1903.
W. C. PRATT.
WIRE AND SLAT WEAVING MACHINE.
APPLICATION FILED SEPT. 25, 1902.
NO MODEL. 2 SHEETS—SHEET 2.
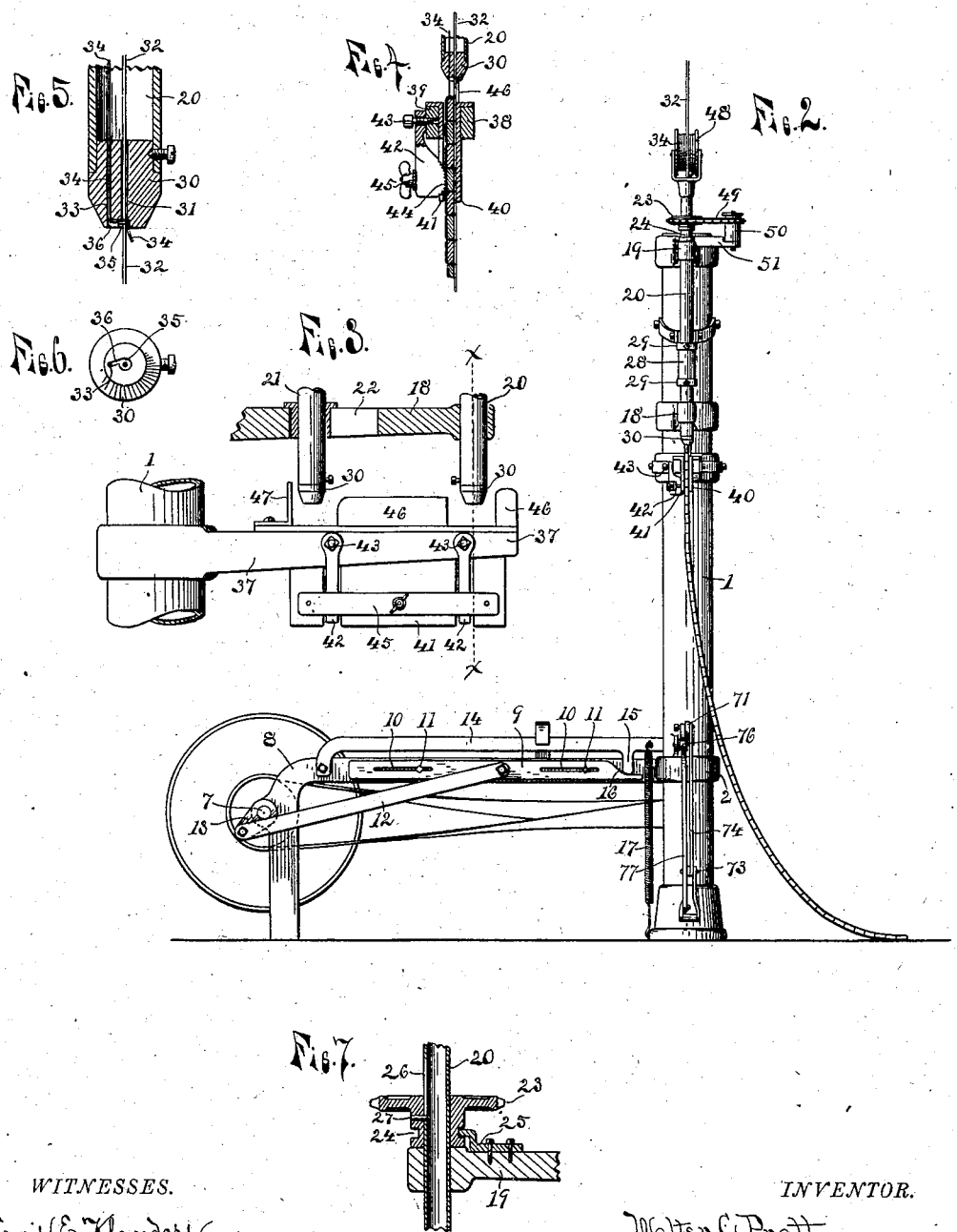
WITNESSES.
INVENTOR.
Walter C. Pratt,
Attorneys.

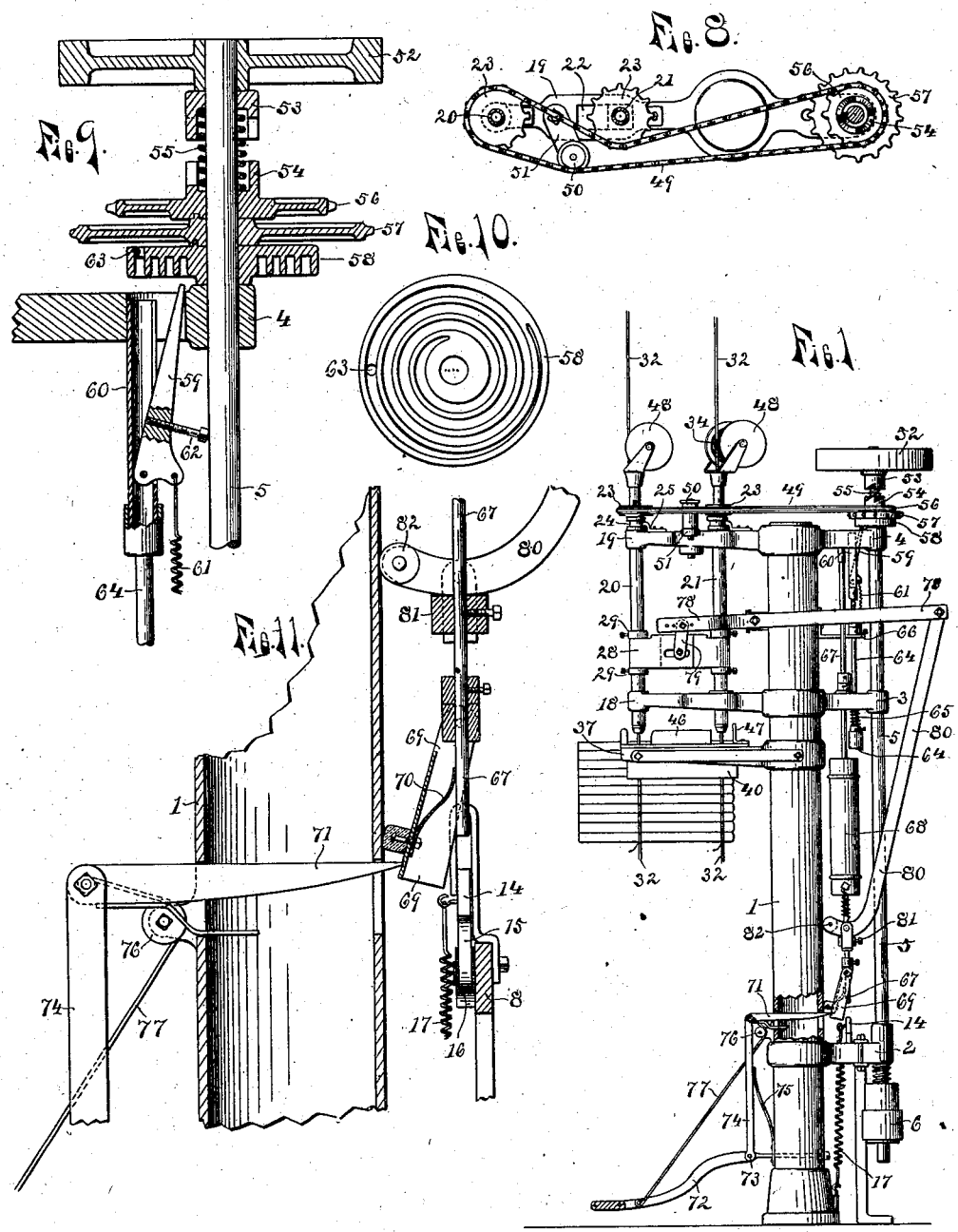

UNITED STATES PATENT OFFICE.

WALTER C. PRATT, OF LANSING, MICHIGAN, ASSIGNOR TO PRATT MANUFACTURING COMPANY, OF LANSING, MICHIGAN.

WIRE-AND-SLAT-WEAVING MACHINE.

SPECIFICATION forming part of Letters Patent No. 725,989, dated April 21, 1903.

Application filed September 25, 1902. Serial No. 124,744. (No model.)

*To all whom it may concern:*

Be it known that I, WALTER C. PRATT, a citizen of the United States of America, residing at Lansing, in the county of Ingham and State of Michigan, have invented certain new and useful Improvements in Wire-and-Slat-Weaving Machines, of which the following is a specification, reference being had therein to the accompanying drawings.

This invention relates to improvements in wire-and-slat-weaving machines; and its object is to provide a simple and efficient machine the arrangement of which greatly facilitates the insertion of the slats and is such that the working parts are all in plain view of the operator and in which the winding mechanism is so constructed that the binding-wire is bound evenly upon the main wire and prevented from being wound upon itself.

To this end the invention consists in providing a vertical supporting-post having arms provided with bearings for the driving-shaft and operating mechanism at one side and the work-clamp and twisters at the opposite side, said twisters being provided with heads having axial recesses of a diameter just sufficient to allow the binding-wire to coil around the main wire therein; and the invention also consists in certain novel features, details of construction, and arrangement of parts, all as hereinafter more fully described, and particularly set forth in the claims, reference being had to the accompanying drawings, in which—

Figure 1 is a front elevation of a device embodying my invention; Fig. 2, a side elevation of the same; Fig. 3, an enlarged detail showing the work-clamp and guide in side elevation. Fig. 4 is a section on the line $x\,x$ of Fig. 3. Fig. 5 is an enlarged detail showing one of the twister-heads in section; Fig. 6, an end view of Fig. 5. Fig. 7 is an enlarged sectional detail showing the manner in which the sprocket-wheels are secured to the twisters and their supporting-arms. Fig. 8 is a plan view showing the arrangement of sprocket wheels and chain for driving the twisters. Fig. 9 is an enlarged detail showing the clutch and its operating mechanism in section. Fig. 10 is an inverted plan view of the spirally-grooved wheel, and Fig. 11 is an enlarged sectional detail of the dog for setting the machine in motion and its adjacent parts.

1 is a vertical tubular supporting-post having the laterally-extending arms 2, 3, and 4, on the ends of which arms are bearings for the vertical shaft 5, which is provided with a pulley at its lower end, engaged by the driving-belt 6, said belt also engaging a pulley on the drive-shaft 7, which shaft is journaled in a bearing on the frame 8, said frame being supported at one end by the arm 2, to which it is attached. A longitudinally-movable bar 9 is supported upon said frame by being provided with slots 10, through which the bolts 11 pass, and said bar is moved longitudinally by a connecting-rod 12, pivoted at one end to the bar and at its opposite end to a crank 13 on the end of the shaft 7. A vibratory bar 14 is pivoted at one end to the frame and near its opposite end is provided with a projecting lug 15 on its lower edge to engage and slide upon the upper edge of the bar 9, which bar is provided with a reduced end 16, forming an incline to raise and lower the bar 14 as the bar 9 is moved back and forth, a spring 17 being attached to the movable end of the vibratory bar to hold said lug firmly in contact with the bar 9.

Extending laterally from the post 1 in a direction opposite to that of the arms 2, 3, and 4 are the arms 18 and 19, each provided with a bearing at its end and an intermediate bearing, in which bearings the tubular twisters 20 and 21 are journaled and have a longitudinal movement, the slots 22 forming the intermediate bearings being elongated, so that the twisters 21 may be adjusted toward or from the twister 20. Sleeved on the upper ends of the twisters above the arm 19 are the sprocket-wheels 23, having grooves 24 in their hubs, which grooves are engaged by retaining-bars 25, secured to said arm, to hold the sprocket-wheels from moving longitudinally on the twisters. Slots 26 in the twisters are engaged by pins 27 on the hubs of the sprocket-wheels, so that said twisters are allowed to move longitudinally and at the same time are rotated by the sprocket-wheels. A cross-head 28 connects the twisters and is held from moving longitudinally therein by the collars 29, and secured within the lower end of the tubular portion of the twisters is a head 30, having an axial opening 31, through which the main wire 32 extends, and a smaller opening 33 at a distance from the opening 31 for the binding-wire 34. An axial recess 35 is formed in the lower end of the head, which recess is of such diameter as to just allow the binding-wire to lie therein around the main wire, and a groove 36 leads from the opening 33 tangentially into the recess 35, so that the binding-wire in being coiled around the main wire is guided within the head, and as the last turn of the coil is made within the recess it is formed closely around the main wire and the binding-wire thus prevented from winding upon itself.

Below the arm 18 and in line with it is the arm 37, extending outward from the supporting-post and divided vertically to allow the woven strip to pass through. The arm 37 is formed of the two halves 38 and 39, to the adjacent faces of which are secured the downwardly-extending clamping-plates 40 and 41, the plate 41 being slotted vertically to allow the clamping members 42 to project therethrough and engage the woven strip of slats and yieldingly clamp the same against vertical movement. These clamping members 42 are pivotally attached at their upper ends to the arm by the screw-bolts 43 and are held with their enlarged and roughened sides 44 in contact with the slats by a spring 45, and on the upper side of the arm are the guides 46 to guide the slats to place, a stop 47 being also provided at the inner end of the slot in the arm to gage the work.

Secured to the upper end of each of the twisters is a spool 48, on which the binding-wire 34 is wound, and the main wire 32 is supplied from above and passes, together with the binding-wire, down through the twisters, which twisters are revolved by the sprocket-chain 49, engaging the sprocket-wheels 23, an idler 50, journaled on the end of a bracket 51, adjustably secured to the arm 19, being provided to engage the chain and serve as a tightener and also to hold one lead of the chain out of contact with the other lead thereof.

On the upper end of the vertical shaft 5 is a balance-wheel 52, and below this wheel is a clutch formed of a fixed member 53 and a member 54, sleeved on the shaft, a spring 55 being interposed between the members to normally hold them separated. Below the clutch member 54 and secured thereto to move therewith are the small and large sprocket-wheels 56 and 57, respectively, and also a wheel 58, formed with a spiral groove in its lower side to receive the end of a lever 59, pivoted at its lower end within a tube 60, which tube is slotted longitudinally to receive the lever, a spring 61 being provided to normally hold said lever out of the slot and in a position to engage the spiral groove at a distance from its outer end when the tube 60 is moved longitudinally upward, as will be hereinafter described.

An adjustable stop 62 is provided to limit the movement of the lever 59 and adjust the same so that it will engage the spiral groove at a greater or lesser distance from the outer end of the groove, where a hole 63 is provided, through which the end of the lever will be projected when it reaches that point.

The tube 60 is secured to the upper end of a rod 64, provided with a bearing on the arm 3, in which it is vertically movable, and a spring 65, sleeved on said rod, holds it normally in its lowest position, to which it is limited by the stop 66. A vertical rod 67 is movable in bearings on the arms 3 and 4, and a weight 68, secured on the rod 67, is adapted to engage the lower end of the rod 64 and move the same upward to engage the lever 59 with the spiral wheel 58 and lift the member 54 of the clutch into engagement with the member 53. Pivotally secured at one end to the lower end of the rod 67 is a foot 69 or channel-shaped casting, which is adapted to embrace the lower end of the rod and form an extension thereof, so that when the movable end of the vibratory bar 14 is raised it will engage the lower end of the foot and raise the rod 67 and weight 68 to bring the weight into contact with the rod 64 to operate the clutch, as described.

A spring 70, secured to the inner side of the back wall of the foot, presses at its free end against the rod 67 and normally holds the foot out of the path of the bar 14, and a push-bar 71 extends through slots in the post 1 and engages the foot at one end to press the same toward the rod against the action of said spring. A foot-lever 72 is pivoted to the post at 73, and a bar 74 is also pivoted at 73 at one end and to the end of the push-bar at the other, a spring 75 being interposed between the bar 74 and the post to hold the push-bar out of engagement with the foot 69. Adjacent to the upper end of the bar 74 is an ear on the post, upon which ear is journaled a roll 76, engaged by a strap 77, secured at one end to the pivot connecting the bar 74 and push-bar and at the opposite end to the foot-lever, so that when the foot-lever is depressed the strap will project the push-bar through the post and force the foot into the path of the vibrating bar 14.

To lower the twisters into contact with the slat and force the woven strip downward through the clamp, a lever 78 is attached at one end by means of a link 79 to the cross-head 28, said lever being pivoted intermediate its ends to the post 1 and at its opposite end is pivotally connected to a bar 80, having a curved lower end engaging the upper side of a collar 81, secured to the rod 67, said bar 80 being provided with a roll 82 to engage the post 1.

As shown in Fig. 8, the sprocket-chain 49 drives the twisters in opposite directions by passing it around one of the sprocket-wheels 56 or 57, extending it across in engagement with the idler 50, then around the sprocket-wheel on the twister 20, and back in engagement with the side of the sprocket-wheel on the twister 21, adjacent to the lead of the chain engaging said idler.

The operation of the device is as follows: The shaft 7 being a continuously-rotating shaft, the bar 14 is continually vibrated, so that when the operator places a slat in position between the main and binding wires and presses the foot-lever 72 to turn the foot 69 into the path of the bar 14, said bar when it rises will engage the foot and continuing to rise, will force the rod 67 upward carrying with it the weight 68 and the curved end of the bar 80, thus operating through the lever 78 to force the twisters downward until they engage the upper edge of the slat just inserted and force the same downward against the action of the clamping members 42. In the meantime the weight has engaged the end of the rod 64 and against the action of the spring 65 has moved said rod to engage the end of the lever 59 with the spiral groove in the wheel 58 and raise said wheel, the sprocket-wheels 56 and 57, and the movable member 54 of the clutch until said member has engaged the fixed member to transmit motion to the twisters. The clutch does not operate until the twisters have very nearly reached the end of their downward movement, and they are held in that position by the lug 15, riding on the fleet upper edge of the bar 9, until said bar is moved to allow the lug to pass down the incline, when the foot will be released and the twisters raised by the action of the weight 68, the said foot being moved out of the path of the bar by its spring 70. The number of turns which will be given the binding-wire around the main wire is determined by the adjusting-screw 62, which adjusts the lever 59 so that it will engage a greater or less number of turns of the spiral groove, said lever engaging the bottom of the groove and holding the loose member of the clutch in contact with the fixed member until said lever reaches the outer end of the groove. Then it will enter the hole 63 and allow the loose member to drop out of engagement with the fixed member. The lever engaging the hole 63 also forms a positive stop for the twisters, so that the wires will be in a position for the ready insertion of the slat. Should it be desired to make a greater number of turns of the wire than there are turns of the groove, the sprocket-chain may be shifted to the large sprocket-wheel 57, when the twisters will be driven faster or a greater number of turns made in proportion to the number of turns of the groove.

Having thus fully described my invention, what I claim is—

1. In a wire-and-slat-weaving machine, a twister consisting of a head having an axial opening for the main wire, an opening for the binding-wire at a distance from the axial opening, and an axial recess in the head to guide and hold the last turn of the binding-wire in contact with the main wire.

2. In a wire-and-slat-weaving machine, a twister consisting of a head having an axial opening for the main wire, an opening for the binding-wire at a distance from the axial opening, an axial recess in the lower end of the head of a diameter to receive the binding-wire when coiled around the main wire and a groove for the binding-wire leading from the opening for said binding-wire tangentially into the recess.

3. In a wire-and-slat-weaving machine, the combination with the frame thereof consisting of a perpendicular post provided with laterally-extending arms; of twisters journaled in bearings on the arms extending in one direction from said post, driving mechanism for said twisters carried by the arms extending in the opposite direction, and means for regulating the number of turns the twisters shall make and for moving the same longitudinally.

4. In a wire-and-slat-weaving machine, the combination with rotative and longitudinally-movable twisters; of a continuously-rotating shaft, a clutch on said shaft consisting of a fixed and a movable member, a wheel adapted to actuate the said twisters secured to the loose member, a lever to move said twisters longitudinally, a continuously-vibrating bar, and means adapted to engage said bar to actuate the lever and to move the loose member of the clutch into engagement with the fixed member.

5. In a wire-and-slat-weaving machine, the combination with rotative and longitudinally-movable twisters, a continuously-rotating shaft, a lever for moving said twisters longitudinally, and means for intermittently transmitting motion from said shaft to the twisters; of a continuously-vibrating bar, a foot adapted to be swung into the path of said bar to actuate the said lever and the means for moving and transmitting motion to the twisters, and means for moving said foot into and out of the path of the vibrating bar.

6. In a wire-and-slat-weaving machine, the combination with rotative and vertically-movable twisters, a lever for moving the twisters vertically, a continuously-rotating shaft, and a clutch to transmit motion from said shaft to the twisters; of a continuously-vibrating bar, a rod to actuate the lever to move the twisters vertically and to throw the clutch, a foot pivoted on said rod to swing into the path of said vibrating bar, a spring to hold said foot out of the path of the bar, and a foot-lever to throw the foot into the path of the bar.

7. In a wire-and-slat-weaving machine, the combination with rotative and longitudinally-movable twisters, a continuously-rotating shaft, a lever for moving the twisters longitudinally, and a clutch for transmitting motion from the shaft to the twisters; of a driving-shaft, a crank on said shaft, a longitudinally-movable bar having an incline, a connecting-rod pivoted at one end to the longitudinally-movable bar and at its opposite end to the crank, a vibratory bar pivoted at one end and free to rise and fall at its opposite end, a lug on said vibratory bar to engage the incline on the longitudinally-movable bar, a spring to hold the lug in engagement with the incline, a foot adapted to be swung into the path of said vibrating bar, and means for moving said foot.

8. In a wire-and-slat-weaving machine, the combination with rotative twisters and a continuously-rotating shaft; of a clutch to transmit motion to said twisters from said shaft, a spirally-grooved wheel attached to the loose member of said clutch and provided with an opening at the outer end of said groove, a pivoted lever to engage the groove of said wheel and move the loose member into engagement with the fixed member of the clutch and adapted to project through the said opening to stop the rotation of the loose member and to allow it to move out of engagement with the fixed member.

9. In a wire-and-slat-weaving machine, the combination with rotative twisters and a continuously-rotating shaft; of means for transmitting motion from said shaft to the twisters and for limiting the number of turns to be made by the twisters consisting of a clutch one member of which is fixed on said shaft and the other member loose thereon, a sprocket-wheel secured to the loose member, sprocket-wheels on the twisters, a sprocket-chain for said wheels, a spirally-grooved wheel attached to the loose member of the clutch and provided with an opening at the outer end of said groove, a rod, a lever pivoted to the end of said rod to engage said groove and project through the opening, an adjustable stop to determine the point at which the lever shall engage the groove, and means for operating the said rod to engage the lever with the groove and move the loose member of the clutch into engagement with the fixed member.

10. In a wire-and-slat-weaving machine, the combination with rotative twisters and a rotative shaft for driving the same; of sprocket-wheels on said twisters and on the shaft, a sprocket-chain to engage said wheels and transmit motion to the twisters to drive the same in opposite directions by leading the chain from the sprocket on the shaft outward and around the sprocket on the twister farthest from the shaft then back in engagement with the side of the sprocket on the other twister adjacent to the outward lead of the chain, a bracket provided with a roll to engage the outward lead of the chain and hold the same out of contact with the other lead.

11. In a wire-and-slat-weaving machine, the combination of a frame consisting of a vertical post and laterally-extending arms on said post; of vertically-movable twisters journaled in bearings on the arms at one side of the post and provided with slots, a vertical shaft journaled in bearings on the arms at the opposite side of said post, sprocket-wheels sleeved on said twisters provided with grooves in their hubs, retaining-bars secured to the arm of the frame and engaging said grooves, pins in the hubs of the sprocket-wheels engaging the slots in the twisters, a bracket adjustably secured at one end to the said arm and provided with a roll at its opposite end, and a continuous chain engaging the sprocket on the shaft and leading outward over the roll, around the sprocket on the twister farthest from the shaft, and thence backward in engagement with the side adjacent to said roll of the sprocket on the other twister.

12. In a wire-and-slat-weaving machine, the combination with a frame consisting of a vertical post provided with arms extending laterally in opposite directions; of vertical twisters movable longitudinally in bearings on said arms at one side of the post, a vertical shaft mounted in bearings on the arms at the opposite side of said post, sprocket-wheels on the twisters, a clutch on the shaft having a fixed and a loose member, a sprocket-wheel secured to the loose member, means for moving the loose member of the clutch into and out of engagement with the fixed member to control the number of turns to be given to the twisters, a vertically-divided arm on the post projecting outward beneath the twisters and in line therewith to form a guide for the work, and clamping members on said arm to engage and hold the work.

13. In a wire-and-slat-weaving machine, the combination with a frame consisting of a vertical post and arms extending outward therefrom at opposite sides thereof, vertical twisters longitudinally movable in bearings on the arms at one side of the post, and a continuously-rotating shaft mounted in bearings on the arms at the opposite side of said post; of sprocket-wheels on said twisters, a clutch on said shaft having a fixed and a movable member, a sprocket-wheel secured to the movable member, a sprocket-chain engaging said wheels, a spirally-grooved wheel secured to the movable member and having an opening at the outer end of its groove, a tube guided in an opening in one of the arms of the frame and having a slot in its side, a lever pivoted within said tube to engage the spiral groove of the wheel, a stop to limit the movement of said lever, a spring to hold the lever in its limited position and projecting from the slot in the tube, a vertical rod to move the tube longitudinally to throw the clutch, a lever connected to said rod to move the twisters longitudinally, a continuously-vibrating bar, a pivoted foot on the said vertical rod adapted to be moved into and out of the path of said vibrating bar, a foot-lever pivoted to the frame and extending outward beneath the twisters, a push-bar engaging the foot to move the same into the path of the vibrating bar, a spring to move the foot out of the path, a roll on the frame, a strap secured at one end to the push-bar and at the other end to the foot-lever and passed over said roll to project the push-bar into engagement with the foot, and a spring to retract the push-bar.

14. In a machine of the character described the combination with a frame consisting of a vertical post having laterally-extending arms; of rotative and longitudinally-movable tubular twisters journaled in bearings on the said arms of the frame at one side of the post, the bearings for one of said twisters being adjustable upon said arms to allow the twisters to be moved toward or from each other, spools for the binding-wire mounted on the upper ends of the twisters, sprocket-wheels on the twisters, a cross-head connecting the twisters, a lever pivoted intermediate its ends to the frame and at one end to the cross-head, a vertically-divided arm extending outward beneath said twisters, clamping members pivoted to said arm, guides on said arm, a vertical continuously-rotating shaft mounted in bearings on the arms extending in a direction opposite to those for the twisters, a clutch on said shaft consisting of a fixed and a loose member, a spring to move the members apart, sprocket-wheels of different diameters secured to said loose member, a sprocket-chain engaging the sprocket-wheels on the twisters and one of the sprocket-wheels on the shaft, a wheel pivoted with a spiral groove and an opening at the outer end of said groove, a tube longitudinally movable in an opening in the arms of the frame and pivoted with a slot, a lever pivoted within said tube and adapted to engage the spiral groove at its upper end, a stop for said lever, a spring to normally hold said lever out of the slot in the tube, a vertical rod movable in bearings in said arms, a weight on said rod, a lever pivoted near one end to said vertical rod and at its opposite end to the lever which is connected to the cross-head of the twisters, a continuously-vibrating bar, a foot pivoted at one end to the vertical rod near its lower end and adapted to be swung into the path of the vibrating lever, a spring interposed between the foot and lower end of said rod to hold the foot out of the path of the vibrating lever, a foot-lever pivoted at one end to the frame, a push-bar to force the foot into the path of the vibrating lever, a bar connecting the push-bar and the foot-lever, a roll on the frame, a strap attached at one end to the push-bar and at its opposite end to the foot-lever and engaging said roll, and a spring interposed between the frame and the bar connecting the push-bar and foot-lever.

In testimony whereof I affix my signature in presence of two witnesses.

WALTER C. PRATT.

Witnesses:
OTTO F. BARTHEL,
LEWIS E. FLANDERS.